United States Patent
Mano

[11] Patent Number: 6,057,030
[45] Date of Patent: May 2, 2000

[54] POROUS CERAMIC BODY AND KILN FURNITURE MADE FROM A POROUS CERAMIC BODY

[75] Inventor: Toshimasa Mano, Hofu, Japan

[73] Assignee: Kanebo Ltd., Osaka, Japan

[21] Appl. No.: 08/912,581

[22] Filed: Aug. 18, 1997

Related U.S. Application Data

[63] Continuation-in-part of application No. 08/897,313, Jul. 21, 1997, abandoned.

[51] Int. Cl.[7] .................................................... B32B 3/26
[52] U.S. Cl. ................... 428/307.7; 428/141; 428/307.3; 428/318.4; 428/318.6; 428/319.1; 428/336; 428/697; 428/699; 428/701; 428/702; 264/44; 264/48; 427/226; 432/156; 432/262; 432/264
[58] Field of Search ...................................... 428/701, 336, 428/432, 141, 307.3, 318.4, 318.6, 307.7, 319.1, 697, 699, 702; 264/44, 48; 427/226; 432/156, 262, 264

[56] References Cited

U.S. PATENT DOCUMENTS 4,609,562  9/1986  Isenberg et al. ............................. 427/8
4,877,705 10/1989  Polidor .................................. 428/312.6
5,279,904  1/1994  Grandia de L'Eprevier .......... 428/701

*Primary Examiner*—Archene Turner
*Attorney, Agent, or Firm*—Roylance, Abrams, Berdo & Goodman, L.L.P.

[57] ABSTRACT

A porous ceramic body having a ceramic framework is produced having a surface roughness of about 40 microns or less. The ceramic body has a plurality of pores where each pore is interconnected with at least one adjacent pore. The ceramic body is made from a powdered ceramic component and a pore-forming polymeric component such as polymeric beads. The ceramic component is alumina which can contain at least one other component selected from the group consisting of calcium oxide, silicon oxide, magnesium oxide, barium oxide, titanium dioxide, and zirconium dioxide. The pore-forming polymeric beads, such as polymethylmethacrylate beads, each having a particle size of 100 microns or less, are mixed with the ceramic powder. The powdered mixture is compressed under pressure and heated to form a porous ceramic body. A coating of an aqueous dispersion of a metal oxide can be applied to the surface of the ceramic body and heated to produce a smooth and durable coating. The ceramic body is particularly suitable for kiln furniture for supporting a metal or ceramic part during a heating step.

26 Claims, 2 Drawing Sheets

POROUS CERAMIC BODY AND KILN FURNITURE MADE FROM A POROUS CERAMIC BODY

CROSS-REFERENCE TO RELATED APPLICATION

This application is a continuation-in-part application of prior application Ser. No. 08/897,313, filed Jul. 21, 1997 entitled "Porous Ceramic Body and Kiln Furniture Made From a Porous Ceramic Body" by Toshimasa Mano now abandoned.

FIELD OF THE INVENTION

The present invention is directed to a porous ceramic body and to kiln furniture made from the porous ceramic body. More particularly, the invention is directed to a porous ceramic body having an elaborate ceramic framework and a smooth, flat surface suitable for supporting a metal or ceramic part during a heating process.

BACKGROUND OF THE INVENTION

Ceramic materials are used for a variety of purposes including, for example, in the manufacture of heat-resistant substrates and insulating substrates. The ceramic material can be shaped and compressed under pressure or laminated onto another substrate using known techniques. Common ceramic materials include, for example, barium titanate, strontium titanate, lead titanate-lead zirconate, ferritic ceramics, and glass ceramics. The ceramic material is shaped into the desired form using various metal molding techniques, such as, compacting, tape or ribbon casting, extrusion molding and injection molding. The shaped ceramic material is then heated at high temperatures to sinter the ceramic material and form the finished ceramic substrate.

Ceramic materials are also used in forming trays and other devices for supporting a ceramic or powdered metal compact during the firing process to form a sintered ceramic or metal product. Powder metallurgy is a common and economical process for producing complex molded metal parts with high quality and high accuracy. The metal products are made in a similar manner as ceramic products by shaping the metal powder by pressure molding, extrusion or injection molding and compressing the metal powder to the desired shape. Thereafter, the compressed metal powder is baked or fired at a high temperature to sinter the particles and form the molded article. During the firing process, the article is supported on kiln furniture such as a ceramic fixture, sagger, plate or other support surface. Ceramic materials for the kiln furniture are particularly desirable due to the heat resistance and ease of manufacture.

The kiln furniture for supporting the metal or ceramic part during the firing process is made of a refractory material. Examples of ceramic materials include alumina with a bulk specific gravity of 3.0–3.3, alumina-silica with a bulk specific gravity of 2.5–3.0, zirconia with a bulk specific gravity of 4.0–5.0, and magnesia with a bulk specific gravity of 2.5–3.0. In recent years, various lightweight devices have been used to reduce the heat energy required during the firing of the metal or ceramic part. For example, lightweight devices have been made from alumina or alumina-silica compounds. Lightweight kiln furniture has also been manufactured from a ceramic fiberboard made from a heat-resistant inorganic fiber, an inorganic binding material and a heat-resistant powder. Further examples of lightweight devices have been made from ceramic foams made from a sponge-like urethane foam impregnated with a slurry of a powdered ceramic material which is then heated to form a porous ceramic structure. Other lightweight ceramic kiln furniture is made from a refractory material such as an alumina-silica ceramic or a ceramic fiberboard material which is then coated with a thin layer of zirconia.

Porous ceramic substrates have also been produced by forming a mixture of polymeric thermoplastic beads and a ceramic material and heating the mixture to decompose the polymeric thermoplastic beads leaving a porous ceramic body. The resulting ceramic body has interconnected spherical pores and a high strength and thermal shock resistance. An example of this type of ceramic material is disclosed in Japanese Patent Publication 3-1090. The ceramic body is generally formed by combining a granulated ceramic material with a polymeric thermoplastic bead, granulating and mixing the ceramic material and polymeric thermoplastic uniformly. The mixture is then compressed by press molding, removing the polymeric beads from the green part and firing the resulting part to form the finished product. In this process, the granulated ceramic and polymeric thermoplastic beads are mixed uniformly to avoid variation in strength in the products or portions of the resulting product. Uniform mixing of the ceramic material and the polymeric thermoplastic beads prevent separation of the ceramic granules from the polymeric beads.

This prior process, however, has the disadvantage of encapsulating the polymeric beads in the ceramic granules due to the intimate mixing of the ceramic and polymeric beads. The finished product has a surface completely covered with a powder of the ceramic material which completely seals the polymeric beads within the ceramic. During the heating process, the encapsulated polymeric beads within the ceramic powder form cracks in the ceramic. In extreme cases, the encapsulated polymeric beads can create cavities inside the part as a result of the internal pressure of the gas being generated by the heating and decomposition of the polymeric beads during the heating process. Consequently, these prior processes make it difficult to produce a uniform ceramic body having a uniform strength and surface texture.

To overcome the disadvantages of the prior processes which encapsulate the polymeric beads, other methods were developed to obtain a stable product and uniform ceramic body with good strength. In this process, the polymeric beads used for forming the pores and the ceramic component as the raw material to make the ceramic body have the same particle size distribution. The difference in the particle shape and the particle size between the polymeric beads and the ceramic granule is small. Coordinating the particle size distribution of the polymeric beads and the ceramic component during the mixing of the base materials prevent the mixture from separating during the molding process. In addition, the polymeric beads are easily removed during the heating step. An example of the process is disclosed in Japanese Patent Publication 7-223879.

There has been a recent increase in the demand for smaller and more accurate ceramic parts and metal parts made by the powder metallurgy processes where the shaped product is fired to produce the finished part. The finished part is produced by producing a green part from a powdered composition and firing the green part at a high temperature. During the firing process, the size of the part can shrink by as much as 20%. In order to obtain a highly accurate finished product, it is important that the part shrink uniformly in all dimensions. It is known that the properties of the raw material and the packing density of the part affect the uniform shrinking. In addition, it is recognized that the support surface of the kiln furniture supporting the part affects the finished product during the shrinking of the part. It is important to have a sufficiently smooth surface supporting the part which does not hinder the shrinking. It is desirable that the support surface have a substantially smooth surface and a low friction coefficient.

When heating relatively large green parts on kiln furniture which has a rough surface, the rough surface of the kiln furniture is transferred to the surface of the part during the heating and shrinking process. Typically, this produces a rough or streaked face on the surface of the resulting part. In other cases, particles from the kiln furniture can break off and adhere to the part being heated.

Efforts to produce kiln furniture having a smooth surface resulted in a lightweight fiberboard material made from a refractory composite material. The fiberboard can have a surface roughness of 2–40 microns as generally disclosed in Japanese Patent Publication 62-275078. Other processes have produced a lightweight fireproof material having a surface coated with $Al_2O_3$ alumina powder having a 95–100% purity. This produces a composite material having a surface roughness of 2–40 microns as disclosed in Japanese Patent Publication 62-283885. These fiberboard materials, although being refractory, do not have sufficient strength and are subject to scratching. The soft surface of the fiberboard makes it difficult to maintain a smooth surface, thereby increasing the maintenance of the face of the fiberboard.

Accordingly, there is a continuing need in the industry for ceramic materials and kiln furniture which overcome the disadvantages of the prior ceramic materials.

SUMMARY OF THE INVENTION

The present invention is directed to a porous ceramic body and to kiln furniture made from the porous ceramic body. The invention is further directed to a process for producing a porous ceramic body having an elaborate ceramic framework with a plurality of pores therein and a smooth surface suitable for supporting metal or ceramic parts during a heating process.

Accordingly, a primary object of the invention is to provide a porous ceramic body having a ceramic framework with a plurality of substantially spherical pores where each of the pores are interconnected to at least one other pore and having a substantially flat, smooth surface.

A further object of the invention is to provide a lightweight ceramic substrate and to provide kiln furniture that is durable and easy to manufacture.

Another object of the invention is to provide a porous ceramic body and kiln furniture having a smooth surface for supporting a compressed metal or ceramic part during a heating or sintering process for producing a highly accurate sintered part without forming scratches on the surface of the resulting sintered part.

Still another object of the invention is to provide a porous ceramic body and kiln furniture having a flat surface defined by open pores and surface areas having a surface roughness of less than about 40 microns.

Another object of the invention is to provide a porous ceramic body and kiln furniture having a porous ceramic framework and a surface coating of a material that is substantially non-reactive with the ceramic framework or the part being supported by the kiln furniture.

A further object of the invention is to provide a porous ceramic body and kiln furniture having an elaborate ceramic framework and a metal oxide coating wherein the ceramic framework has a surface roughness of about 40 microns or less.

Another object of the invention is to provide a porous ceramic body and kiln furniture having a ceramic framework having a smooth surface capable of supporting a compressed metal or ceramic powder part during a heating process without interfering with the shrinking of the metal or ceramic part.

The invention is further directed to a process for producing a porous ceramic body having a substantially flat or planar face and a smooth surface. The process basically includes the step of mixing a sinterable ceramic component and a pore-forming polymeric material. The pore-forming polymeric material is typically thermoplastic polymeric beads. The ceramic component and the polymeric beads are uniformly mixed to produce a mixture having a particle size of about 45–300 microns. The powder mixture is formed into a desired shape and compressed at a pressure of about 500–1000 $Kg/cm^2$ and heated at a sufficient temperature to sinter the ceramic material and remove, decompose and vaporize the polymeric beads to produce a porous ceramic body. The preferred ceramic components are sinterable alumina and calcined alumina. The ceramic components can contain at least one second component selected from the group consisting of silicon dioxide, calcium oxide, magnesium oxide, barium oxide, titanium dioxide and zirconium dioxide.

These and other aspects of the invention are basically attained by providing a porous ceramic body comprising a ceramic framework having a plurality of substantially spherical pores wherein substantially all of the pores are interconnected with at least one adjacent pore and wherein the body has a smooth, planar surface with a surface roughness of about 40 microns or less.

The aspects of the invention are further attained by providing a process for producing heat-resistant kiln furniture comprising the steps of forming a mixture of a powdered ceramic component and a pore-forming polymeric component, compressing the mixture and shaping into the kiln furniture, and heating the shaped mixture to form a porous ceramic body having a ceramic framework and plurality of substantially spherical pores, wherein each of the pores is interconnected with at least one adjacent pore and wherein the device has a smooth surface with a surface roughness of about 40 microns or less.

These and other objects, advantages, and salient features of the invention will become apparent to one skilled in the art in view of the following detailed description taken in conjunction with the annexed drawings which form a part of this original disclosure.

BRIEF DESCRIPTION OF THE DRAWINGS

Referring to the drawings which form a part of this disclosure in which.

DETAILED DESCRIPTION OF THE INVENTION

Figure 1:
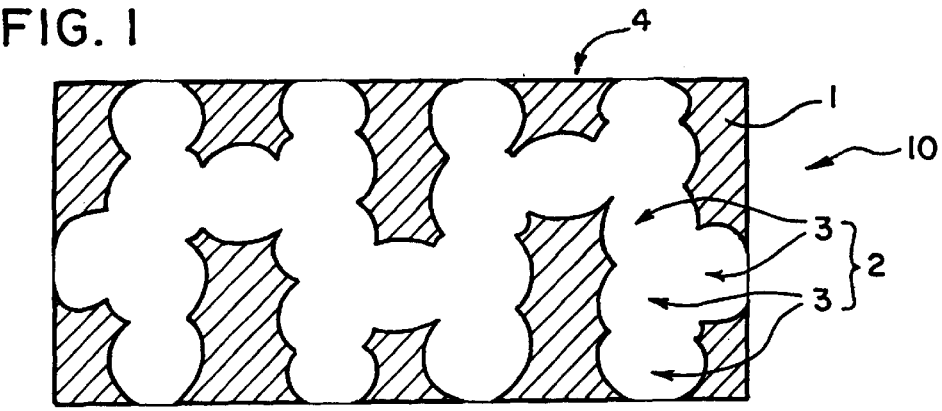
FIG. 1 is a cross-sectional side view illustrating the ceramic framework of the porous ceramic body in a first embodiment of the invention.

The present invention is directed to a porous ceramic body and to kiln furniture or other devices made from the porous ceramic body. Referring to FIG. 1, the porous ceramic body 10 has a ceramic framework 1 and a porous portion 2. The porous portion 2 is formed from a plurality of substantially spherical pores 3. Each of the pores 3 is preferably interconnected with at least one adjacent pore so that the resulting body has a porosity within predetermined limits.

As illustrated in FIG. 1, the device and porous ceramic body 10 has a substantially flat, planar face having areas with a substantially smooth surface 4. In preferred embodiments of the invention, the surface 4 of the porous ceramic body has a surface roughness of about 40 microns or less as discussed in further detail hereinafter. In further embodiments, the surface roughness can be about 30 microns or less and, more preferably, 15 microns or less. Surface roughness of 1 micron has also been obtained on the surface of the porous ceramic body.

Figure 5:
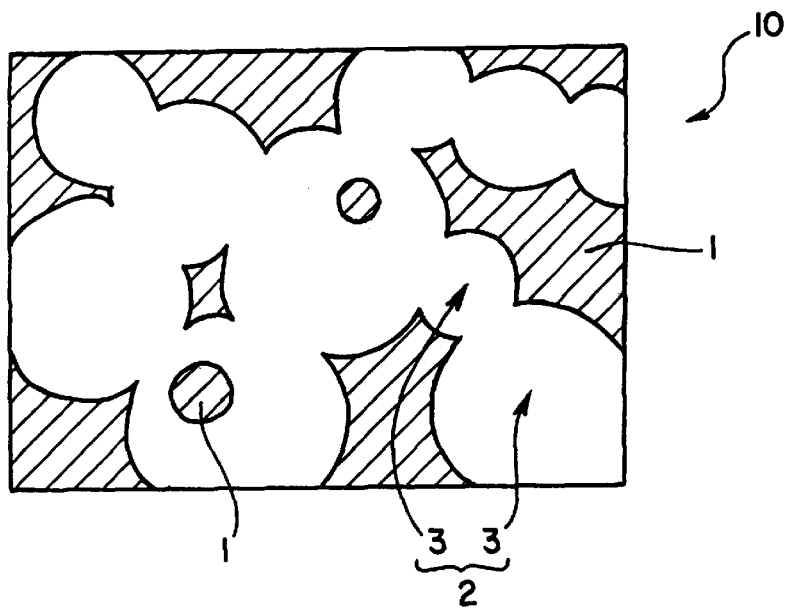
FIG. 5 is a cross-sectional top view illustrating the internal structure of the porous ceramic body of the embodiment of FIG. 1.
Figure 6:
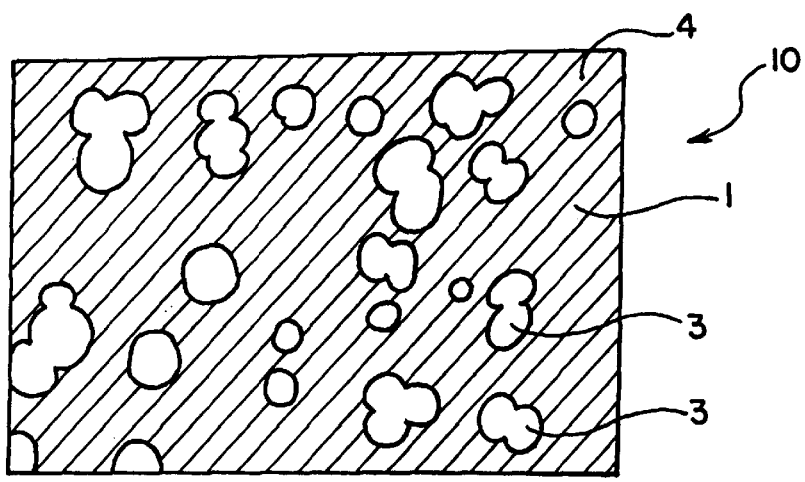
FIG. 6 is a top view illustrating the surface structure of the porous ceramic body in an embodiment of the invention.

The porous ceramic body 10 has an internal porous structure as illustrated in FIG. 5. As shown in FIG. 5, the substantially spherical pores 3 are interconnected with one another to form the ceramic framework 1. FIG. 6 illustrates the top surface 4 of the porous ceramic body 10. As shown, the surface 4 is formed from the ceramic framework 1 and includes a plurality of the pores 3 in the surface of the body to define a porous surface.

In embodiments of the invention, the porous ceramic body is in the shape of a tray, pin, disc, sagger, plate or other device capable of supporting metal or ceramic parts during a heating step in producing a finished metal or ceramic part. The kiln furniture preferably has a surface substantially as illustrated in FIG. 6, and a porous structure substantially as shown in FIG. 1. The device is generally a flat planar article that can have any desired shape suitable for supporting a metal or ceramic part during the sintering process. For example, the device can be a square tray, rectangular or round disc-shaped devices. The device can be a square measuring about 100 mm to 150 mm square and about 2–6 mm thick. The device can further have side walls for stacking the devices on one another.

The porous ceramic body is produced from a mixture of a ceramic component and pore-forming thermoplastic polymeric beads. The mixture of the ceramic component and thermoplastic polymeric beads are compressed to the desired shaped and heated at a suitable temperature to sinter the ceramic particles and remove or decompose the polymeric beads, thereby forming the porous ceramic body and the ceramic framework. The polymeric beads can be removed by pressing, heating at a suitable temperature to decompose the polymeric beads or by firing.

In embodiments of the invention, the powdered ceramic material is mixed with a binding agent, such as, for example, polyvinylalcohol. The binding agent can be added in the amount of up to about 5% by weight, and preferably about 3% or less by weight based on the weight of the ceramic powder. The binding agent can be added as a dry powder or as an aqueous dispersion.

In preferred embodiments, the ceramic component is a powdered sinterable alumina such as calcined alumina obtained by calcining aluminum hydroxide ($Al(OH)_3$) produced by the Bayer process. Calcined alumina is generally preferred since it is easily sinterable and is readily available in varying particle size and alpha crystalline particle size. In embodiments, the ceramic powder component comprises a sinterable alumina containing less than about 1 wt % silica. The ceramic component can include at least one second compound selected from the group consisting of silicon dioxide, calcium oxide, magnesium oxide, barium oxide, titanium dioxide and zirconium dioxide. The compounds can be added in pure form or supplied by a suitable source such as china clay, talc or other minerals.

The second compound is included in an amount to obtain the desired porous ceramic structure and smooth surface. In preferred embodiments, the second compound can be combined with the calcined alumina in the amount of about 0.05 to about 10.00% by weight based on the total weight of the ceramic composition. In embodiments, the composition includes about 92% alumina and about 8% of the second compound based on the total weight. The mixture of the alumina and the second metal oxides have less than about 20 wt %, preferably less than about 10 wt % of the second metal oxide based on the combined weight of the mixture.

In alternative embodiments, the ceramic powder material can be mullite ($3Al_2O_3.2SiO_2$), cordierite ($2MgO.2Al_2O_3.5SiO_2$) or aluminum titanate ($Al_2O_3.TiO_2$) which are prepared by the sol-gel method. In further alternative embodiments, the ceramic powder can be a mixture of alumina, silica, magnesium oxide and titanium dioxide to produce mullite, cordierite and/or aluminum titanate. The resulting ceramic powder material is preferably reduced to a particle size of about 1 micron or less.

The calcined alumina can further be mixed with a sintering aid such as, for example, magnesium oxide. The sintering aid enables the porous framework to be produced at a lower temperature than otherwise obtainable. Generally, the sintering aid is mixed with the alumina in the amount of 0.05–0.1% by weight of the alumina.

The pore-forming component is a thermoplastic polymeric material typically in the form of polymeric beads or particles which can be admixed with the ceramic powder component to form a substantially uniform and intimate mixture. The pore-forming thermoplastic polymeric beads must be suitable for mixing and compacting with the ceramic component under high pressure, and capable of decomposing and vaporizing during the heat treatment step to produce the porous ceramic framework. Although a number of pore-forming polymeric beads can be used, the preferred polymeric beads are polymethylmethacrylate. Other suitable polymeric beads include, for example, acrylic and methacrylic acid esters, polystyrene, polyethylene, polypropylene, polyvinylchloride, polyamides such as nylons, polyesters, and homo- or copolymers of condensation reactions and mixtures thereof.

In embodiments of the invention, the pore-forming polymeric beads have a particle size of about 30–500 microns ($\mu$m). The average polymeric bead particle size is about 30–300 microns. The process includes selecting polymeric beads so that at least 60 wt % of the beads have a particle within ±50% of the average size of the beads. The particle size of the polymeric beads can be adjusted as necessary by grinding or milling. The ceramic component is granulated or milled so that the average size of the ceramic powder particles is about 0.3–3.0 times the average particles size of the polymeric beads. The ceramic granules are selected so that at least 60 wt % of the polymeric beads have a particle size within ±50 wt % of the average size of ceramic granules. The polymeric beads and the ceramic powder material are mixed together to produce a mixture where at least 60% by weight of the polymeric beads and ceramic powder have a particle size within a range of ±50% of the average particle size of the mixture.

The pore-forming polymeric beads and the ceramic powder component are preferably mixed together as a dry mixture. Thereafter, the mixed materials are shaped and compressed by applying a pressure of about 500–1000 kg/cm$^2$ to form a green part. The resulting green part is then heated in a furnace or kiln at about 450° C. for about 4 hours to remove the polymeric beads and form the porous ceramic body. The heating step can be by keeping the part at a set temperature of 250–500° C. for several hours or by raising the temperature at a rate of 10–25° C. per hour until a temperature of about 450° C. is reached to heat, decompose and remove the polymeric beads. Thereafter, the resulting part is heated for about 2–4 hours at about 1300–1650° C. to produce the finished porous ceramic body.

The relative proportions of the polymeric beads and the ceramic component depends on the materials and desired porosity of the resulting ceramic body. Generally, as the amount of polymeric beads increases, the porosity of the ceramic body increases. The amount of pore-forming polymeric beads preferably ranges from about 15% to about 60% by weight based on the combined weight of the polymeric beads and the ceramic component. The ceramic component is typically included in the amount of about 40 wt % to about 85 wt %. A suitable porous ceramic body is formed by a 60:40 ratio comprising 60 wt % ceramic material and about 40 wt % of the pore-forming polymeric beads.

The porous ceramic body is preferably produced by forming a mixture of the pore-forming polymeric beads and the ceramic component so that the powder ceramic component forms a continuous elaborate ceramic framework throughout the final product. In this respect, it is desirable that the pore-forming polymeric beads also form a continuous network throughout the green part and that the ceramic component and the polymeric beads limit the number of isolated areas surrounded by or encapsulated within the part. It is particularly desirable to mix the components so that the pore-forming polymeric beads form a continuous network to the surface of the green part so that during the heating step, the polymeric beads are not entrapped within the ceramic framework. Providing a continuous network of the polymeric beads allows the escape of gases generated during the heat decomposition of the polymer and prevents cracks and bulges in the ceramic framework.

The resulting porous ceramic body has a porous surface defined by smooth areas separated by the pores. The porosity of the ceramic body is preferably sufficient to prevent a metal or ceramic part from sticking to the surface of the ceramic body during the sintering step. The apparent porosity of the ceramic body is generally about 30% to about 80%, preferably at least 40%, and the ventilation resistance is about 150 KPa•s/m or less. The apparent porosity and apparent density are measured by standard equipment, such as, for example, a dry densitometer Accupick made by Shimazu of Japan according to ASTMD 2856. The apparent porosity is based only on the open pores of the ceramic body. The gas permeability is determined by measuring the ventilation resistance using a gas permeability measuring device such as a KES-F8-AP1 by Kato Tech of Japan. The measurement of the gas permeability provides an indication that the pores are interconnected with one another.

It is also desirable to adjust the particle size and particle size distribution of the ceramic powder component to be substantially similar to the particle size and particle size distribution of the polymeric beads used as the pore-forming component before the components are mixed together to form a loose, powdered mixture. Preferably, at least about 60% of the particles have a particle size within 50% of the average particle of the mixture. The mixture is then molded, compressed and fired to produce the porous ceramic body with the desired flat, smooth surface.

In further embodiments of the invention, the porous ceramic body is formed into kiln furniture, such as a tray, where the surface of the ceramic body includes a non-reactive cladding or coating material. It is desirable to provide kiln furniture coated with a non-reactive material when heating some forms of metal or ceramic parts which may otherwise react with the ceramic framework of the ceramic body. The coating material can be the same or different from the ceramic component used to form the ceramic body. In embodiments where the coating material is different from the ceramic component, it is desirable to select a coating material having a heat expansion coefficient similar to the expansion coefficient of the ceramic body to prevent the coating from flaking, chipping or separating from the ceramic framework during the heating process. The surface of the porous ceramic body can be roughened by blasting or other similar methods to increase the adhesion of the coating material. Alternatively, the surface of the ceramic body can be coated with a first material having a heat expansion coefficient complementing the ceramic body. The first coating can be roughened using known techniques prior to applying a final coating material.

The surface roughness of the porous ceramic body is determined using a commercially available surface roughness measuring device such as the device available from Tokyo Seimithu of Japan as sold under the tradename Surfcom. The surface roughness is a measurement of the finely spaced surface-texture irregularities. The roughness-height index value is a number which equals the arithmetic average deviation of the minute surface irregularities from a hypothetical perfect surface. The surface roughness of the ceramic body of the invention is the measurement of the difference between the maximum peak or highest point and the lowest trough or lowest point on the measured surface and is referred to as the $R_{max}$ value. The surface roughness is expressed as micrometers ($\mu$m).

Figure 2:
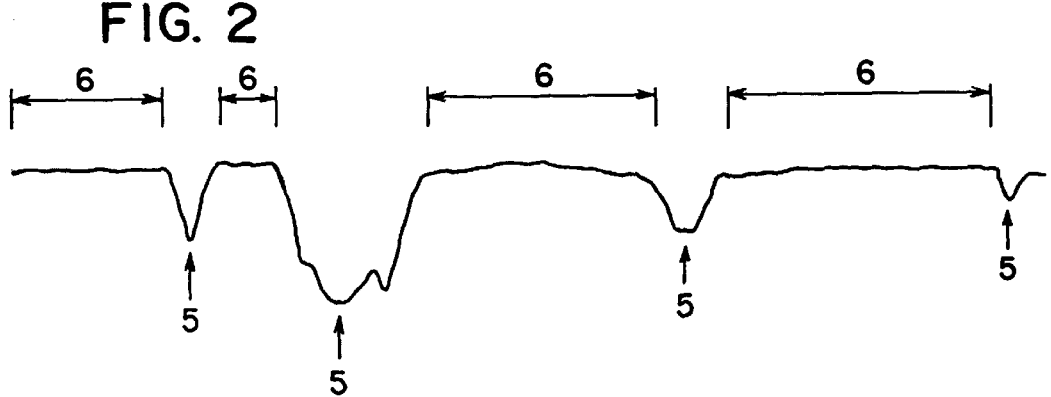
FIG. 2 is a graph illustrating the surface roughness of the porous ceramic body of the embodiment of FIG. 1.
Figure 3:
FIG. 3 is a diagram illustrating the surface roughness of a ceramic body of the prior art.
Figure 4:
FIG. 4 is a graph illustrating the surface roughness of a fiberboard composite of the prior art.

Referring to FIG. 2, a section curve is shown obtained by measuring the surface of the porous ceramic body of the invention by a contact-type measuring device. The roughness measurement is made from the surface 6 which corresponds to the surface which contacts a workpiece during use of the device. The pores 5 are disregarded in measuring the surface roughness of the ceramic body of the invention. The surface roughness of surface 6 defines the surface roughness of the porous ceramic body. FIG. 3 shows the curve of the surface roughness measurement of a conventional ceramic refractory material. FIG. 4 shows the surface roughness of a commercially available fiberboard.

The resulting porous ceramic body has a surface roughness preferably about 40 $\mu$m or less, and generally less than 30 $\mu$m. In further embodiments, the porous ceramic body has a surface roughness of about 15 $\mu$m or less. The ceramic framework of the body permits the surface of the body to be ground and polished to obtain a surface roughness of about 1 $\mu$m or less. Although smooth surfaces of kiln furniture can cause the ceramic or metal part to stick, the porous surface and air permeability of the ceramic body prevent sticking.

Various processes can be used for applying the coating material to the porous ceramic body. For example, a plasma flame can be used which dispenses a partially melted or completely melted coating material onto the surface of the ceramic body. However, plasma flame deposition is generally less preferred due to the high cost of the equipment and operating expenses. In preferred embodiments, the coating material is applied as an aqueous dispersion which is then heated to form the coating of the dispersant on the ceramic body.

Figure 7:
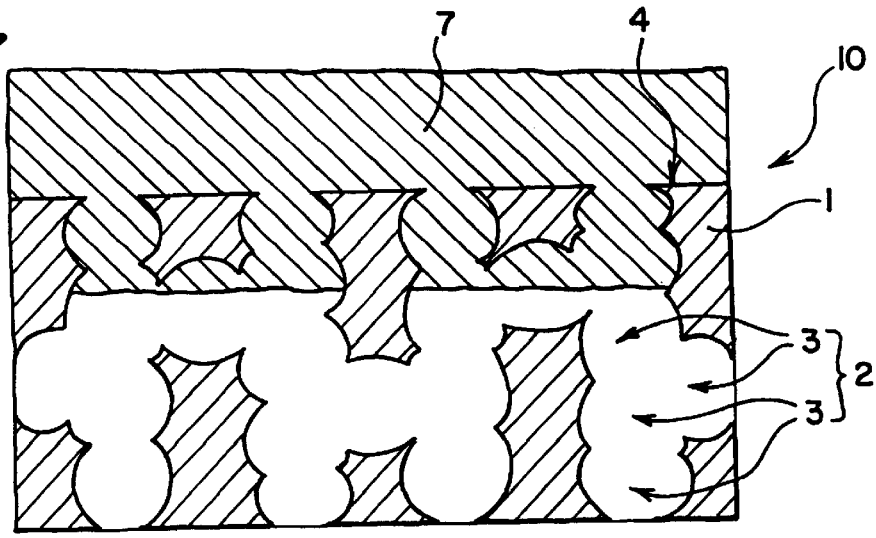
FIG. 7 illustrates a cross-sectional side view of the porous ceramic body having a surface coating where the coating penetrates the surface of the body and interlocks with the pores of the body.

Referring to FIG. 7, the coating material 7 is applied to penetrate the pores 3 of the ceramic body 1 since the pores are open to the surface. In this manner, the coating material 7 is anchored to the pores 3 and the surface of the ceramic body 1, thereby eliminating the need to treat the surface of the ceramic body 1 prior to applying the coating 7.

In preferred embodiments, the coating material 7 is applied to the surface of the ceramic body 1 to have a thickness in the range of about 50–300 microns. It has been found that when the coating material is applied to have a thickness less than about 50 microns, the coating is not sufficiently thick to provide the desired result. Alternatively, applying a coating having a thickness of more than 300 microns produces a thick layer which is prone to cracking, chipping and flaking during repetitive heating cycles.

Preferably, the surface coating is applied as a substantially continuous and uniform thickness. A smooth and uniform thickness of the coating material is provided by providing a smooth surface on the ceramic body. Preferably, the surface of the ceramic body has a surface roughness of about 15 microns or less. Providing a smooth surface on the ceramic body generally produces a smoother surface of the coating material.

In preferred embodiments, the coating material is applied as an aqueous dispersion by spray coating or a curtain flow coating process as known in the art. The ceramic body can further be dipped into the coating dispersion to form the coating layer. Spray coating is generally preferred since it is easier to control the application and thickness of the coating and the penetration of the coating material into the pores of the ceramic body. Preferably, the viscosity of the coating dispersion is adjusted to about 100–500 cps by adjusting the concentration of the material in the carrier or dispersant. It has been found that the coating dispersion having a viscosity of less than about 100 cps penetrates the pores of the ceramic body too deeply, thereby increasing the weight of the ceramic body. A coating dispersion having a viscosity of more than about 500 cps produces a thick coating that does not spray smoothly and does not penetrate the pores of the ceramic body sufficiently to adhere and produce a uniform and smooth coating. The coated ceramic body is then heated to form the finished coating. Typically, the coated ceramic body is heated to about 1300–1500° C. for about 2–5 hours.

The coating material is preferably applied to the ceramic body as an aqueous dispersion having particles having a size of about 30 microns or less, and preferably an average particle size of about 3–10 microns. It has been found that when the particle size is greater than about 30 microns, the particles tend to precipitate or separate from the dispersion, thereby inhibiting the spraying and coating process. The large particle size greater than about 30 microns produces a coating typically having a rough surface which produces scratches and imperfections on the surface of the workpiece supported on the ceramic body during a heating step. In addition, the bonding of the coating material decreases and the surface of the coating material and the ceramic framework flakes and chips and sticks to the workpiece being heated.

Although a number of suitable coating materials can be used, the preferred coating materials are metal oxides, such as alumina, magnesia and zirconia. Zirconia is generally preferred since it is less reactive than other coating materials and does not react with the metal or ceramic part. Zirconia obtained by the electromelting process is generally preferred. Electromelting zirconia is obtained by melting a zirconia containing material in an electric furnace, cooling, solidifying and then powdering the resulting material.

Although pure zirconia can be used, pure zirconia produces a phase transformation accompanying a volume change at around 1000° C. Therefore, it is desirable to stabilize the electromelted zirconia by adding yttria or calcium oxide. In one embodiment, the coating composition is about 6 wt % to about 12 wt % yttria and about 88 wt % to 94 wt % zirconia. In further embodiments, the coating composition is about 3 wt % to 8 wt % calcium oxide and about 92 wt % to 97 wt % zirconia. When calcium oxide is used as the stabilizing agent, it is desirable to use high purity alumina containing less than about 1 wt % silica for the ceramic body to prevent the calcium oxide from reacting with the silica and separating from the alumina.

The following non-limiting examples illustrate the invention and are not intended to limit the scope of the invention.

EXAMPLE 1

Commercially obtained calcined alumina having an average particle size of 1 micron ($\mu$m) and an $\alpha$-crystalline particle size of about 0.8 micron was mixed with calcium carbonate, talc and china clay to obtain a ceramic composition comprising 92 wt % $Al_2O_3$, 6.0 wt % $SiO_2$, 1.0 wt % CaO and 1.0 wt % MgO. The composition was mixed and powdered in a ball mill to an average particle size of less than about 1 micrometer. The powdered composition was then mixed with a PVA (polyvinylalcohol) aqueous dispersion in an amount to form a mixture containing 3% by weight PVA based on the weight of the ceramic composition. The PVA was added as a binder material for the ceramic particles. The resulting mixture was spray dried and graded using a standard sieve to recover the ceramic powder having a particle size in the range of about 45 microns to about 300 microns.

Polymethylmethacrylate beads having an average particle size of 100 microns were graded by a standard sieve to obtain polymer beads having a particle size in the range of 45 to about 300 microns. The ceramic granules were mixed with the polymeric beads in the ratio of 60:40 by weight and blended uniformly to obtain a dry mixture.

The resulting ceramic/polymer mixture was placed in a metal mold (100 mm×100 mm×7 mm) and molded at a pressure of 1000 kg/cm$^2$ using a single shaft hydraulic press (oil press) to form a compression molded sheet. The compressed sheet was heated at 450° C. for 4 hours in an electric oven to decompose and vaporize the polymer and form the porous ceramic body. The sheet was then heated at 1600° C. for 2 hours. The resulting sheet had a thickness of about 3 mm.

The roughness of the surface of the resulting ceramic body was measured in five randomly selected 3 mm square areas by a tracer method using a Surfcom made by Tokyo Seimithu of Japan. The section curve is represented in FIG. 2. The magnification in the horizontal direction was 100 fold and the magnification in the vertical direction was 500 fold, and the speed of the tracer was 0.3 mm/sec. Ten fragments having a length of 10 mm (100 microns) were selected from the section curve. The difference between the highest point and the lowest point was measured.

The apparent porosity and apparent density were measured by a dry densitometer made by Shimazu of Japan under the tradename Accupick 1330. The method used was defined by ASTMD 2856. The apparent density was based on the weight of the ceramic body divided by the volume of the ceramic framework and internal pores. The porosity was determined as a measurement of the gas permeability using a gas permeability measuring device made by Kato Tech of Japan sold under the tradename KES-F8-AP1. Bulk density was measured using standard procedures and is based on the weight of the ceramic body divided by the volume of the ceramic framework, internal pores and open pores.

The strength of the ceramic body was determined by taking a 50 mm by 10 mm section and measuring the three point flexural strength with a span of 40 mm. The flexural strength was measured using an Autograph universal testing machine made by Shimazu of Japan. A strip of adhesive tape measuring 50 mm by 50 mm was applied to the surface of the ceramic body and then peeled off the surface. The number of ceramic particles adhering to the tape is the measurement of particles flaking, chipping and falling off the ceramic body.

The results of these tests are presented in Table 1.

COMPARATIVE EXAMPLE 1

A porous ceramic body was made according to the process of Example 1 using only calcined alumina as the ceramic material and polymethylmethacrylate beads as the pore-forming polymeric material. The alumina had an average particle size of 1 micron and an a-crystalline particle size of 0.8 micron. The properties of the resulting ceramic body were measured as in Example 1 and are presented in Table 1.

TABLE 1

|  |  | Example 1 | Comparative Example 1 |
|---|---|---|---|
| Apparent Porosity | % | 58 | 62 |
| Bulk Density | g/cm$^3$ | 1.6 | 1.4 |
| Apparent Density | g/cm$^3$ | 3.8 | 3.8 |
| Gas Permeability | KPa · s/m | 10 | 8 |
| Strength | MPa | 18 | 10 |
| Surface Roughness | $\mu$m | 30 | 50 |
| Powder Falling | The number of particles sticking | 26 | 135 |

As shown in Table 1, no differences in the apparent density of the ceramic body of Example 1 and Comparative Example 1 were present. The data indicates that the ceramic body of Comparative Example 1 has enclosed pores inside the ceramic framework other than pores formed by the pore-forming polymeric beads. The data indicates that the ceramic framework of Example 1 is more dense than that of Comparative Example 1.

The ceramic body of Example 1 has a higher strength and smoother surface compared to Comparative Example 1. The increased strength of the ceramic body reduces the flaking and chipping as shown by the fewer particles adhering on the tape. The ceramic body of Example 1 has a surface roughness of 30 microns and is suitable for devices for heating a ceramic or metal part without interfering with the shrinkage of the part during the sintering process. The surface of the ceramic body is resistant to scratching with a steel nail indicating that the ceramic body is suitable for kiln furniture with excellent durability.

EXAMPLES 2–7

A porous ceramic body was produced in the same manner as in Example 1 using a sinterable alumina comprising 99.95 wt % $Al_2O_3$ and 0.05 wt % MgO. Polymethylmethacrylate beads were used as the pore-forming polymeric component. The alumina had an average particle size of 0.4 microns and an a-crystalline particle size of 0.3 microns. The ratio of the ceramic component and the pore-forming polymeric component and properties of the ceramic body are shown in Table 2.

The resulting ceramic body was then coated with zirconia containing 9.0 wt % yttria having a particle size of less than about 30 micrometers. The coating material mixture was powdered in a ball mill to produce a powder having an average particle size of about 8 microns or less. An aqueous dispersion of polyvinylalcohol was added to produce a coating dispersion having a viscosity of about 300 cps containing 1.0% by weight PVA based on the combined weight of the zirconia and yttria. The dispersion was sprayed onto the ceramic body to obtain a thickness of 200 microns. The coated ceramic body was fired at 1400° C. for 5 hours in an electric furnace to obtain a porous ceramic device suitable as kiln furniture.

The coated ceramic body was cut with a diamond cutter to obtain a vertical cross-section through the coating and the body. The cross-section was examined using a stereo microscope to determine whether and to what extent the coating had penetrated the pores of the ceramic body. The results are shown in Table 2.

Each of the coated ceramic bodies were subjected to a heating-cooling test by heating the ceramic body to 1400° C. for 6 hours by heating at a rate of 300° C. per hour. The ceramic body was then cooled to room temperature at a rate of 300° C. per hour. The coating was visually examined for chipping, cracking and flaking. The results are shown in Table 2 where an X shows some abnormalities after one to five repetitions of the heat treatment, a triangle showing abnormalities after six to ten repetitions of the heat treatment and a O when no abnormalities were observed after ten repetitions of the heat treatment.

COMPARATIVE EXAMPLE 2

An alumina-silica refractory ceramic body was made by the process of Comparative Example 1 was coated with the coating composition of Examples 2–7. The apparent porosity, apparent density, bulk density, and surface roughness were measured as shown in Table 2.

COMPARATIVE EXAMPLE 3

A commercially obtained ceramic fiberboard material was coated by the process of Examples 2–7. The coating was examined and the apparent density, apparent porosity, bulk density and surface roughness were measured by the process of Examples 2–7 as shown in Table 2.

TABLE 2

|  | EX. 2 | EX. 3 | EX. 4 | EX. 5 | EX. 6 | EX. 7 | COMP. EX. 2 | COMP. EX. 3 |
|---|---|---|---|---|---|---|---|---|
| Beads wt % | 20 | 22.5 | 25 | 30 | 40 | 50 | Fireproof Material | Fiberboard |
| Granule wt % | 80 | 77.5 | 75 | 70 | 60 | 50 | | |
| Apparent Porosity % | 38 | 41 | 45 | 51 | 61 | 70 | 15 | 70 |
| Bulk Density g/cm³ | 2.3 | 2.2 | 2.1 | 1.9 | 1.5 | 1.2 | 2.9 | 1.0 |
| Apparent Density g/cm³ | 3.9 | 3.9 | 3.9 | 3.9 | 3.9 | 3.9 | 3.4 | 3.4 |
| Ventilation resistance KPa · s/m | 210 | 150 | 39 | 17 | 4.3 | 1.4 | >250 | 60 |
| Strength MPa | 82 | 73 | 68 | 44 | 21 | 10 | 15 | 10 |
| Surface Roughness μm | 12 | 15 | 11 | 10 | 14 | 8 | 60 | 40 |
| Infiltration of coating Solution | Yes | Yes | Yes | Yes | Yes | Yes | No | No |
| Cracking and Flaking | Δ | ○ | ○ | ○ | ○ | ○ | X | X |

The ventilation resistance was determined for each ceramic body by a gas permeability measuring apparatus at a pressure of 250 Kpa•sec/m. When the measured resistance is greater than 250, the gas permeability is judged to be negligible. The ventilation resistance and gas permeability provide an indication of the pores in the ceramic body being connected together.

From the data of Table 2, the surface roughness of the porous ceramic body is shown to have an important role in the durability of the coating. It is believed that the high degree of chipping, flaking and cracking after the heat test of Comparative Examples 2 and 3 are the result of an insufficient number of pores in the surface of the body and the insufficient anchoring of the coating in the pores.

The fiberboard of Comparative Example 3 did not produce a durable coating even though the fiberboard had a ventilation resistance or gas permeability of 60. The adherence and anchoring of the coating is dependent on the pores on the surface of the body and not the gas permeability. The ceramic body of Examples 2–7 have continuous pores and a smooth surface. The pores on the surface of the ceramic body provide a surface for adhering the coating without a roughening pre-treatment and without requiring plasma flame coating. The coating dispersion can be applied to the ceramic body by spraying the dispersion to obtain a coating having a uniform thickness and excellent durability.

EXAMPLES 8–12

In Examples 8–12, a sinterable alumina as in Examples 2–7 was mixed with a highly pure silica ($SiO_2$) in the amounts identified in Table 3. This mixture of the ceramic component was powdered in a ball mill and mixed with 3% PVA binder and 40 wt % polymethylmethacrylate beads as in Example 1. The mixture was compressed at 1000 Kg/cm$^2$, heated for 4 hours at 450° C. and then heated for 2 hours at 1600° C. as in Example 1. Two samples of the ceramic bodies were obtained for each of the Examples 8–12.

The resulting ceramic bodies for each of Examples 8–12 were then coated with a zirconia composition by an electromelting process to form kiln furniture. One of the zirconia coating compositions contained 9 wt % yttria, while the other zirconia coating composition contained 4 wt % calcium oxide. The average particle size of the zirconia coating compositions was about 30 μm.

The resulting coated ceramic bodies were subjected to a heating-cooling test as in Examples 2–7 by heating to 1400° C. for 6 hours and then cooled to room temperature. The heating-cooling test was repeated 25 times and the results shown in Table 3.

TABLE 3

| | | EX. 8 | EX. 9 | EX. 10 | EX. 11 | EX. 12 |
|---|---|---|---|---|---|---|
| Composition | Sinterable Alumina | 100 | 99.5 | 99 | 98 | 95 |
| | Highly Pure Silica | 0 | 0.5 | 1 | 2 | 5 |
| Apparent Porosity | % | 61 | 61 | 60 | 60 | 58 |
| Bulk Density | g/cm$^3$ | 1.5 | 1.5 | 1.5 | 1.5 | 1.6 |
| Apparent Density | g/cm$^3$ | 3.9 | 3.9 | 3.9 | 3.8 | 3.8 |
| Ventilation Resistance | KPa · s/m | 4 | 8 | 6 | 6 | 3 |
| Surface Roughness | μm | 6 | 10 | 9 | 8 | 10 |
| Infiltration of Coating Solution | | Yes | Yes | Yes | Yes | Yes |
| The Number of Flakes | Zirconia Stabilized by Yttria | No flakes | No flakes | No flakes | No flakes | No flakes |
| | Zirconia Stabilized by CaO | No flakes | No flakes | No flakes | 20 | 5 |

The data of Table 3 shows that the addition of pure silica to the sinterable alumina produces a porous ceramic body having a smooth surface and a ceramic framework. The coating material was selected according to the reactivity of the ceramic or metal part on the ceramic body. The data of Table 3 shows that when a zirconia coating contains calcium oxide, the ceramic body should contain less than 1 wt % silica. It is believed that the calcium oxide in the zirconia coating reacts with the silica ($SiO_2$) in the ceramic body and elutes. The reaction produces an unstable zirconia layer which chips and flakes.

While advantageous embodiments have been chosen to illustrate the invention, it will be understood by those skilled in the art that various embodiments and modifications can be made therein without departing from the spirit and scope of the invention as defined in the appended claims.

What is claimed is:

1. A porous ceramic body comprising
  a ceramic framework, comprising alumina and about 0.05 wt % to about 10.0 wt % of at least one second compound selected from the group consisting of $SiO_2$, CaO, MgO, BaO, $TiO_2$ and $ZrO_2$ and having a plurality of substantially spherical pores, wherein substantially all of the pores are interconnected with at least one adjacent pore, and wherein said body has a planar surface with a surface roughness of less than about 40 microns.

2. The ceramic body of claim 1, wherein said ceramic framework comprises about 92.0% by weight alumina and about 8.0% by weight of said at least one second compound.

3. The ceramic body of claim 1, further comprising a coating material on at least one surface of said ceramic body, wherein said coating material penetrates said pores and is selected from the group consisting of zirconia, magnesia and alumina.

4. The ceramic body of claim 3, wherein said coating material has a thickness of about 50 to about 300 microns.

5. The ceramic body of claim 3, wherein said body has a surface roughness of about 15 microns or less.

6. The ceramic body of claim 3, wherein said coating material is stabilized zirconia comprising about 6 wt % to about 12 wt % by weight yttria and 88% to 94% zirconia.

7. The ceramic body of claim 3, wherein said coating material comprises about 3% to about 8% by weight calcium oxide and about 92 wt % to about 97 wt % zirconia.

8. The ceramic body of claim 1, wherein said ceramic framework comprises alumina having less than 1 wt % silica.

9. The ceramic body of claim 1, wherein said body has a ventilation resistance of about 150 Kpa•s/m or less.

10. A heat-resistant kiln furniture device having a surface for supporting a workpiece during a heat treatment, said device comprising a porous ceramic body having a ceramic framework comprising alumina and about 0.05 wt % to about 10 wt % of at least one second compound selected from the group consisting of $SiO_2$, CaO, MqO, BaO, $TiO_2$ and $ZrO_3$, and having a plurality of substantially spherical pores, wherein each of said pores is interconnected with at least one adjacent pore, wherein said device has at least one surface having a surface roughness of about 40 microns or less.

11. The device of claim 10, further comprising a coating on at least one surface of said body wherein said coating is selected from the group consisting of zirconia, magnesia and alumina.

12. The device of claim 11, wherein said coating material has a thickness of about 50 to about 300 microns.

13. The device of claim 11, wherein said surface has a surface roughness of about 15 microns or less.

14. The device of claim 10, wherein said ceramic framework comprises alumina having less than about 1 wt % silica.

15. The device of claim 11, wherein said coating material comprises about 6 wt % to about 12 wt % yttria and about 88 wt % to about 94 wt % zirconia.

16. The device of claim 11, wherein said coating material comprises about 3% to about 8% by weight calcium oxide and about 92 wt % to about 97 wt % zirconia.

17. The device of claim 10, wherein said porous ceramic framework has an apparent porosity of at least 40%.

18. A process for producing a heat-resistant porous ceramic body comprising the steps of forming a mixture of a powdered ceramic component and a pore-forming thermoplastic polymeric component, compressing said mixture and shaping into said body, and heating said shaped mixture to form said porous ceramic body having a ceramic framework comprising about 0.05 wt % to about 10 wt % alumina and at least one second compound selected from the group consisting of $SiO_2$, CaO, MgO, BaO, $TiO_2$ and $ZrO_2$, and a plurality of substantially spherical pores, wherein each of said pores is interconnected with at least one adjacent pore, and wherein said device has a planar surface with a surface roughness of about 40 microns or less.

19. The process of claim 18, further comprising applying a coating material on said at least one surface to form a coating having a thickness of about 50 to about 300 microns, wherein said coating has a particle size of about 30 microns or less.

20. The process of claim 18, wherein said coating material is selected from the group consisting of zirconia, magnesia and alumina.

21. The process of claim 18, wherein said at least one surface has a surface roughness of about 15 microns or less.

22. The process of claim 18, wherein said coating material comprises about 6 wt % to about 12 wt % yttria and about 88 wt % to about 94 wt % zirconia.

23. The process of claim 18, wherein said coating material comprises about 3 wt % to about 8 wt % calcium oxide and about 93 wt % to about 97 wt % zirconia.

24. The process of claim 18, comprising compressing said mixture at a pressure of about 500–1000 kg/cm$^2$ and heating said compressed mixture at a temperature of about 400–500° C.

25. The process of claim 18, wherein said pore-forming polymer material is polymeric beads selected from the group consisting of polymethylmethacrylate, polystyrene, polyethylene, polypropylene, polyvinylchloride and polyamides, and wherein said beads and ceramic component have a particle size of 45–300 microns.

26. The process of claim 18, wherein said ceramic component comprises alumina having less than about 1 wt % silica.

* * * * *